United States Patent [19]

Clements et al.

[11] Patent Number: 4,697,048
[45] Date of Patent: Sep. 29, 1987

[54] GRAPHICS TABLET MENU LOCATOR ACCOMMODATING DIFFERING SIZES OF PAPER

[75] Inventors: Brad Clements, Ft. Collins; John C. Keith, Loveland, both of Colo.

[73] Assignee: Hewlett-Packard Company, Palo Alto, Calif.

[21] Appl. No.: 857,006

[22] Filed: Apr. 29, 1986

[51] Int. Cl.⁴ .............................................. G08C 21/00
[52] U.S. Cl. ..................................................... 178/18
[58] Field of Search .............................. 178/18, 19, 20

[56] References Cited

U.S. PATENT DOCUMENTS 4,184,147  1/1980  Seelbach ................................ 178/18
4,555,590  11/1985  Kishi et al. ............................ 178/18

Primary Examiner—Stafford D. Schreyer
Attorney, Agent, or Firm—Edward L. Miller

[57] ABSTRACT

A digitizer platen or tablet incorporates a recess within its surface. The recess has plural multiples of four interior corners for interlocking with predetermined sizes of rectangular paper wherein no two lengths are equal and no two widths are equal. Menus are plotted or otherwise prepared upon the predetermined sizes. The menu preparation is such that when a sheet of any of the predetermined sizes is registered within its corresponding interior corners of the recess there obtains a constant (X, Y) offset between a selected point of reference upon the tablet, such as the origin, and a selected point of reference upon the menu. Such automatic constant offset with registration frees the operator of the digitizer from manually instructing the applications software as to the exact location of the menu.

2 Claims, 1 Drawing Figure

GRAPHICS TABLET MENU LOCATOR ACCOMMODATING DIFFERING SIZES OF PAPER

BACKGROUND AND SUMMARY OF THE INVENTION

It is common to use a graphics tablet (digitizer) as an input device for a variety of applications. Not only are coordinates entered as data to be processed in their own right, but it is frequently convenient to use the stylus to control the various modes of operation available within the application. This may be accomplished by digitizing points within icons visible on a menu upon the tablet. Since menus may become worn or be misplaced, it is also common for a software application package to provide for the plotting of replacement menus as needed. The size of paper used by the user in plotting a new menu may well depend upon the user's cultural setting. One way to allow this variability is to require the user to digitize the coordinates of diagonal corners of the new menu. This allows the software application package to determine where on the table the menu lies. It would be desirable to free the user from such a requirement, which could be done if it were arranged that the icons of the menu were always in a fixed location upon the tablet, regardless of the paper size.

Ensuring that the icons of a menu plotted by the application software at the behest of the user are always located at the same place upon the tablet can be accomplished as follows. First, the plotting process is made responsive to the size of paper being used. Some plotters, for example, actually find the corners of the paper at the start of the plotting process. Other plotters require that the user move the pen to two or more corners of the paper. Either way, if the sheet of paper is of a standard size (e.g., one of the ANSI sizes or one of the ISO sizes) the software can arrange that the menu be plotted onto the paper with a corresponding selected offset from a reference location on the sheet (e.g., the lower left corner). Second, it is arranged that each size of paper be automatically registered in a selected corresponding location upon the tablet. The corresponding locations are selected such that, for each size of paper upon which a menu is plotted, there obtains for each icon in the menu a constant (x, y) offset between those icons and the origin of the tablet. In a preferred embodiment each standard size sheet of paper is automatically registered by its fitting with a corresponding portion of a recess in the surface of the tablet. Each size of paper interlocks with its corresponding portion of the recess, and with no other, with the result that each size sheet is registered in a position upon the tablet associated with that size. All four corners of the paper engage the recess, with the further result that the sheet is not only registered, but also restrained from sliding about. A cover sheet of mylar also matches and fits into the entire recess, and serves to protect the menu. In this way the user can create a menu upon any standard size paper recognized by the software and matched by the recess, put the menu onto the tablet such that it is engaged by the appropriate corners of the recess, and proceed to use the menu without further instruction to the software application concerning where the menu actually ended up upon the tablet. This obtains because the menu automatically ends up where the software, by design, expects it to be.

DESCRIPTION OF THE PREFERRED EMBODIMENT

Figure 1:
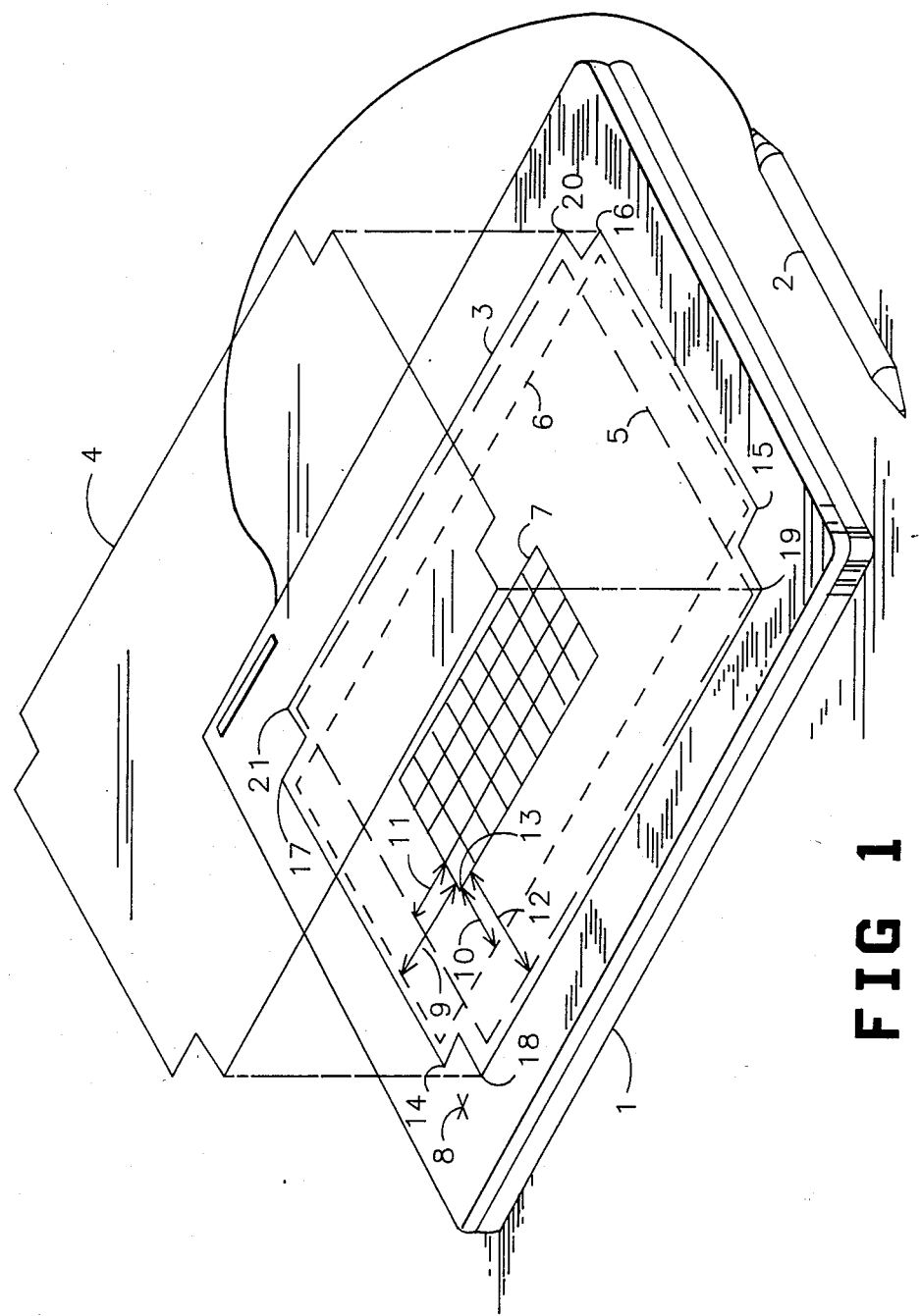
FIG. 1 is a perspective view of a digitizer tablet incorporating a menu locator accommodating differing sizes of paper.

Refer now to FIG. 1, wherein is shown a perspective view of a digitizer platen or tablet 1 constructed according to the principles of the invention. For commercially available examples, see the Hewlett-Packard models 46087A and 46088A Digitizing Tablets. A handheld stylus 2 is used to digitize the coordinates of points upon the surface of the tablet 1. The tablet 1 is connected to some host processing means (not shown) which operates upon the (X, Y) coordinate data in a preselected manner, according to the task that the user is engaged in. A menu, such as that indicated by rectangular grid 7, may be used to indicate the nature of the task to the host processor. To make such an indication the user establishes a control mode by any of a variety of convenient means (e.g., a push-button switch) and subsequently digitizes within menu 7 a point within a box associated with the desired task or mode of operation.

The menu 7 is drawn or plotted upon a sheet of paper. Long dotted line 5 and short dotted line 6 indicate how two different sizes of paper, upon which the menu 7 may appear, interlock or fit snugly inside a recess 3 within the surface of the tablet 1. The different sizes of paper may be, for example, eight and one half by eleven inches and A4, or eleven by seventeen inches and B4. The recess 3 forms a plane surface perhaps twenty-five or thirty thousandths of an inch below the top of the tablet 1. A cover sheet of clear mylar or other similar material also fits into the recess 3. The purpose of the mylar sheet 4 is to act as a cover that protects the menu 7 from wear and tear.

It will be understood that menu 7 is not part of the tablet, but is instead an artifact produced upon a piece of paper by the user or his software. As such, the menu 7 is not built into the tablet, and some means must be employed to make the specific location of the menu 7 known to the application software executed by the host processor. The object of the invention is to allow the software to correctly assume the location of the menu, and free the operator from having to expressly inform the software of the location of the menu 7 upon the tablet 1. This object is subject only to the restriction that the size of paper upon which the menu is prepared be one of a plurality of known standard sizes. It is specifically not required that the specific size used be specified in advance of any particular use of the application; only that the size choosen be one of the known standard sizes.

The object of the invention may be achieved by arranging that there be a constant offset of some (X, Y) coordinates from a point of reference 8 in the coordinate system of the tablet 1 (e.g., the origin) and a reference location 13 of the menu (e.g., its lower left-hand corner). The points of reference 8 and 13 need not be the particular ones shown in FIG. 1, but may be arbitrarily fixed by design wherever desired. Two things need to be done to achieve the desired fixed (X, Y) offset of point 13 from point 8. First, the menu 7 is prepared in a way that locates each menu element in a preselected position upon the sheet of paper, according to the size of that sheet. To this end, a menu prepared upon a sheet of paper represented by short dotted line 6 will have its reference location 13 be at an X and Y displacement of (9, 10) relative to the lower left-hand corner of the sheet. A sheet of size represented by long dotted line 5 would have a different displacement: (11, 12). (It will be understood, of course, that the numbers just given in parentheses are reference numerals, and not actual units of distance). Second, the corners 14 and 18 of the recess 3 are chosen such that their displacement from one another complements the above-mentioned offsets (9, 10) and (11, 12) by producing a constant overall (X, Y) offset between points 8 and 13. That is, regardless of the size of paper (5 or 6), the menu 7 always appears at the same place upon the tablet 1. Hence, digitized features of the menu always have their respective same coordinates.

Such registration of different sizes of paper with automatic constant menu location is made possible for the present invention by the different sizes of paper each having lengths and widths different from the lengths and widths of the other sizes; i.e., no two lengths are the same and no two widths are the same. Because of this it is possible to equip the recess 3 with pluralities of multiples of four interior corners, and to do so in a way that no group of four associated interior corners lies within the region bounded by any other such group. In this way each size of sheet to be registered has its own four corners within which to interlock. In particular, note how a sheet of size represented by short dotted line 6 fits exactly into the four interior corners 14, 15, 16, and 17. Note that an attempt to fit a corner of such a size (6) sheet into interior corner 18 will prevent at least one adjacent corner of the sheet from fitting into the corresponding interior corner. (Strictly speaking, to guarantee this appears requiring that the length of no sheet be equal to the width of any other. However, this does not seem to be an unreasonable requirement in a world where standard size sheets of paper have pronounced rectangularity.) Note also that a sheet of size indicated by long dotted line 5 fits exactly into interior corners 18, 19, 20, and 21, and that such a sheet would not fit correctly into interior corners 14, 15, 16, and 17. Finally, note that while the example of FIG. 1 pertains to two different sizes of paper, it could as easily handle three or more different sizes, provided only that each additional size, considered in its turn, had either the longest length and the least width, or the greatest width and the shortest length, among all of the sizes previously used.

Lastly, it may be convenient to arrange the associated groups of four interior corners (14, 15, 16, 17 and 18, 19, 20, 21, etc.) symmetrically about each other, so that their principal diagonals all intersect at a single point. That is, arranged such that lines between corners 21–19, 20–18, 14–16, and 17–15 all intersect at a single point that is the center of both sizes 5 and 6.

We claim:

1. Apparatus comprising a digitizing surface upon which coordinates are digitized, the digitizing surface having within its extent a recess bounded by a plurality of groups of four corners, the corners in each group describing an associated rectangle, and the corners of each group lying outside the rectangles described by the corners of the other groups.

2. Apparatus as in claim 1 wherein the principal diagonals of each of the rectangles intersect in a common point.

* * * * *